No. 764,510.

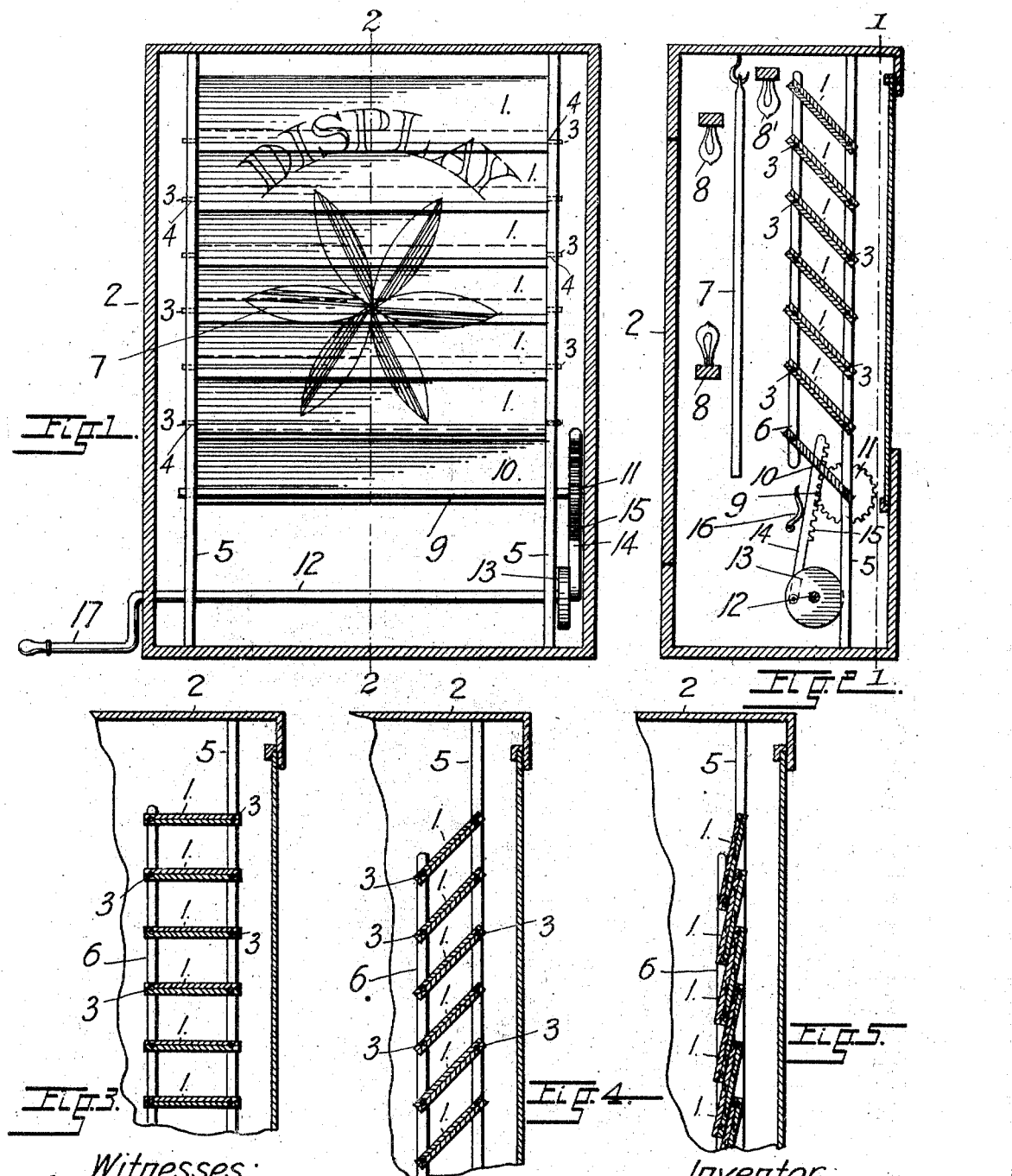

Patented July 5, 1904.

UNITED STATES PATENT OFFICE.

JOHN I. WILEY, OF DENVER, COLORADO, ASSIGNOR TO ABNER A. PHIPPS, OF NEW YORK, N. Y.

ADVERTISING DISPLAY APPARATUS.

SPECIFICATION forming part of Letters Patent No. 764,510, dated July 5, 1904.

Application filed May 26, 1903. Serial No. 158,802. (No model.)

*To all whom it may concern:*

Be it known that I, JOHN I. WILEY, a citizen of the United States, residing at Denver, in the county of Denver and State of Colorado, have invented certain new and useful Improvements in Advertising Display Apparatus, of which the following is a specification.

This invention relates to apparatus for displaying signs, pictures, or objects of any sort for advertising or other purposes, and when used as an advertising device it displays the object and the reflection of the object at different periods of time and also at a period of time between the display of the object itself and the reflection of the object it operates to display to the spectator such a confused reflection of the object as will attract attention of the spectator and at another period of time operates to present to the spectator a substantially plane blank mirror.

Referring to the accompanying drawings, Figure 1 is a front view of the apparatus, the front of the casing being removed at line 1 1 of Fig. 2. Fig. 2 is a sectional side view on line 2 2 of Fig. 1 of the apparatus, showing the series of parallel mirrors resting at an angle of forty-five degrees to the "line of sight," the front of the casing of the apparatus being restored. Fig. 3 is a similar view showing the mirrors in the same plane with the line of sight or, in other words, perpendicular to the plane of the picture 7. Fig. 4 is a similar view showing the mirrors at right angles to the mirrors positioned as shown in Fig. 2 or forty-five degrees to the mirrors shown in Fig. 3 and also at forty-five degrees to the line of sight. Fig. 5 is a similar view showing the mirrors in their folded or lapped position, whereat they form a substantially plane mirror.

In this device a series of parallel double-faced plane blank mirrors 1, preferably rectangular, are positioned horizontally or vertically in the front of a casing or box 2 by means of pintles 3, projecting from the ends of the mirrors near each corner into sockets 4 in the parallel bars 5 and 6, one of which, preferably 5, is stationary with respect to the casing and the other of which, 6, is movable throughout its length through equal arcs of circles centered in the sockets in the stationary bar 5.

Within the casing a picture or other object 7 is positioned just behind the mirrors. In front of or behind the object 7 and also within the casing are shown electric lights 8; but any other light may be substituted, such as daylight, which may be utilized by opening the back of the casing when a translucent object is to be displayed. Further than this, the object may be displayed without light from within the casing or through the rear of the casing, for, as is obvious, the light may come upon the object through the glass window in the front of the casing, and such would be preferable when opaque objects are to be displayed. When the light comes from the front, the mirrors themselves operate to collect and throw the light upon the object. The electric light 8', which is positioned within the casing between the mirrors and the object, is especially useful when it is desired to display in the absence of other light an opaque object.

As shown in Figs. 1 and 2, rays incident from the object 7 fall upon the under faces of the upper adjacent mirrors and are reflected therefrom at an equal angle downward upon the upper faces of the next lower adjacent mirrors, wherefrom they are again reflected at an equal angle to the spectator. At such positions of the mirrors the spectator sees into the upper faces only of the mirrors and the eye is affected by the virtual image of the object. In the reflection of the whole of such image each of the mirrors 1 serves its share, which is proportionate to the field of its surface which is exposed to the rays incident from the object, the series assembling the complete image of the object.

A line from the eye of the spectator to the image of the object is herein termed the "line of sight."

In order to attract attention or "catch" the eye of the spectator, the mirrors are lowered until they assume the positions shown in Fig. 3, at which position the object itself is visible between the mirrors to the spectator and not its reflected image. During the movement of the mirrors from their position shown in Fig. 2 to that shown in Fig. 3 the reflections of the object are broken up because of the multiplicity of reflections and there is presented to the spectator's eye a confused kaleidoscopic effect. During the further downward movement of the mirrors from the position shown in Fig. 3 to the position shown in Fig. 4, whereat the mirrors again rest with their faces (in this case their upper faces) at an angle of forty-five degress to the line of sight, there is again revealed to the spectator the same confused kaleidoscopic effect as was revealed when the mirrors turned from their positions shown in Fig. 2 to that shown in Fig. 3 and for the same reasons. When the mirrors are in the position shown in Fig. 4, a virtual image of the object identical with that revealed when the mirrors were positioned as in Figs. 1 and 2 is revealed to the spectator by reason of the mirrors having double parallel faces. In this position, however, the spectator sees into the under faces only of the mirrors. Now upon a further movement of the mirrors downward from the position shown in Fig. 4 to that shown in Fig. 5 the reflected image is again broken up and reveals to the spectator the same or a like confused kaleidoscopic effect described with respect to that revealed in the movements of the mirrors from the positions shown in Fig. 2 to Fig. 3 and from Fig. 3 to Fig. 4.

In a position shown in Fig. 5 the mirrors lap closely upon one another and present to the spectator a substantially plane mirror marred only by the almost invisible lines at their lapping. A reverse or upward movement of the mirrors would reveal the object to the spectator just as before described with respect to the downward movement of the mirrors, but in reverse consecutive order. At the termination of the upward movement of the mirrors a substantially plane mirror would be again obtained.

The movement of the mirrors upward and downward on their axes is preferably accomplished by means of a revoluble shaft 9 parallel to the outer long edge of the mirrors and journaled at the end of the series of mirrors, preferably in the stationary bars 5, as shown in Fig. 2. Rigid with this shaft and projecting diametrically therefrom is a plate 10, to the free end edge of which the movable bar 6 is fastened and the plate maintained parallel with the next adjacent mirror, so that upon the turning of the shaft 9 the bar 6 must move and also all the mirrors. At one end of the shaft 9 of the plate 10 is a pinion 11, fast upon the shaft. Parallel with the axis of the shaft of the plate 10 and distanced from it out of the way of the movement of the plate 10 is a power-shaft 12, having at one end a crank-wheel 13, to the outer side of which is pivoted at a point off its center a pitman-rod 14, having on one edge a rack 15, which meshes with the teeth of the pinion 11 upon the shaft of the plate 10. The power-shaft 12 is revolved by any suitable mechanism, such as a hand-crank 17. The turning of the power-shaft 12 moves the pitman back and forth, and hence the pinion on the shaft 9 back and forth, and therefore the plate 10 and the mirrors back and forth, as described, to attain the several different revelations of the object. A spring-guide 16, Fig. 2, fastened on the side of the casing, presses on the pitman and keeps its rack in mesh with the pinion 11.

When the mirrors are turned to either extreme, they overlap and, besides forming a snbstantially plane mirror, they form a screen to hide the mechanism while the picture or object is being changed, whether this change be made by an attendant or be done automatically and whether under artificial light or in daylight.

The best image has been found to be obtained when the mirrors are distanced from each other, so that when the mirrors rest at an angle of forty-five degrees to the line of sight each mirror will be of sufficient width to cover the space between its axis and the axis of the adjacent mirror which is nearest its free edge.

While I have described and shown the mirrors as hinged after the manner of the well-known Venetian blind, it is obvious that they may be pivoted centrally or in any other manner which will permit their movements in parallel relation to reflect to the spectator an assembly of the image of the object, and other modifications in details of structure and arrangement may be made to adapt my invention for various purposes without departing from the spirit of the concluding claims.

I claim—

1. In a display apparatus, a casing or closure provided with an opening in the front thereof, an object in said closure, a series of double-faced, parallel, opaque blank mirrors hinged axially parallel and movable in parallel relation, spanning and closing said window-opening in the manner and for the purpose, substantially as described.

2. In a display apparatus, a casing or closure provided with a window-opening in the front thereof, a series of doubled-faced, parallel, opaque, blank mirrors closing said opening, an object located behind said series of mirrors, in combination with means for moving said mirrors in parallel relation to reveal said object and its reflection at different periods of time, substantially as described.

3. In a display apparatus, a casing or closure provided with a window-opening in the front thereof, a series of double-faced parallel opaque blank mirrors hinged axially parallel and movable in parallel relation to present to the spectator either a substantially plane mirror, a virtual image or a confused image of the object substantially as described.

4. In a display apparatus, a casing or closure provided with a window-opening in the front thereof, a series of double-faced, parallel opaque blank mirrors hinged axially parallel and movable in parallel relation to present to the spectator in sequence, a substantially plane blank mirror, a confused image of the object, a virtual image of the object, a confused image of the object, the object, a confused image of the object, a virtual image of the object, a confused image of the object, and a substantially plane blank mirror, during its movement substantially as described.

5. In a display apparatus, a casing or closure provided with a window-opening in its front an object therein, and two or more parallel blank mirrors interposed between the object and the eye of the spectator and adapted to reveal to the spectator a superreflection of the image of said object, substantially as described.

In testimony whereof I affix my signature in presence of two witnesses.

JOHN I. WILEY.

Witnesses:
A. ROLAND JOHNSON,
GEO. M. WILEY.